United States Patent [19]

Lewis

[11] E Re. 31,479

[45] Reissued Jan. 3, 1984

[54] HOT WIRE TONGUE AND GROOVE CUTTING APPARATUS

[76] Inventor: David L. Lewis, 9 Candee Rd., Prospect, Conn. 06712

[21] Appl. No.: 427,159

[22] Filed: Sep. 29, 1982

Related U.S. Patent Documents

Reissue of:

[64] Patent No.: 4,221,148
Issued: Sep. 9, 1980
Appl. No.: 23,019
Filed: Mar. 22, 1979

[51] Int. Cl.[3] ..... B26F 3/12

[52] U.S. Cl. ..... 83/869; 83/171; 83/874; 83/875

[58] Field of Search ..... 83/171, 869, 874, 875, 83/862, 865

[56] References Cited

U.S. PATENT DOCUMENTS

| | | | |
|---|---|---|---|
| 127,270 | 5/1872 | Robinson | 83/171 X |
| 1,955,395 | 4/1934 | Tueth | 83/171 X |
| 2,157,151 | 5/1939 | Stackhouse | 83/171 X |
| 3,300,253 | 1/1967 | Hylak | 83/171 X |
| 3,788,178 | 1/1974 | Pantel | 83/171 |
| 3,916,147 | 10/1975 | Mercer | 83/171 X |
| 3,921,480 | 11/1975 | Ball | 83/171 X |
| 3,924,495 | 12/1975 | DerMarderosian | 83/171 X |
| 4,018,116 | 4/1977 | Treffner et al. | 83/171 X |

FOREIGN PATENT DOCUMENTS

| | | | |
|---|---|---|---|
| 1093984 | 12/1960 | Fed. Rep. of Germany | 83/171 |

*Primary Examiner*—Frank T. Yost

[57] ABSTRACT

A machine for cutting grooves in foam workpieces includes a plurality of vertically spaced U-shaped cutting wires mounted on pairs of mounting posts. One leg of each U-shaped wire is mounted on one post, while the other leg is mounted on the other post. The posts are mounted on a frame so as to be adjustable in spacing and vertical position with respect to each other, so the widths of the grooves can thereby be adjusted. Horizontal slice-cutting wires are provided behind the groove-cutting wires so that grooves and slices can be cut simultaneously. The slice-cutting wires are aligned at an angle with the vertical so that each slice-cutting wire exits the workpiece before all those beneath it. One version produces tongue-and-groove sheet, while shiplap sheets are produced by the other version.

17 Claims, 12 Drawing Figures

HOT WIRE TONGUE AND GROOVE CUTTING APPARATUS

Matter enclosed in heavy brackets [ ] appears in the original patent but forms no part of this reissue specification; matter printed in italics indicates the additions made by reissue.

BACKGROUND OF THE INVENTION

The present invention is directed to cutting foamed thermoplastic material. It finds particular application as a method of cutting foamed insulation material into insulative sheets.

It has been suggested in U.S. Pat. No. 3,788,175 to Pantell to cut rigid foam blocks into segments by employing hot wires. The hot-wires melt the thermoplastic resin from which the foam is made and thereby allows slices to be cut in the material. This method can be employed advantageously to cut the material into sheets so as to provide insulation boards for building and other purposes.

Once the sheets have been cut, it is often desired to provide interlocking edges to provide for tongue-and-groove or ship-lap joints. A method for performing this task is disclosed in U.S. Pat. No. 3,924,495 to DerMarderosian, which disclose the use of two spaced-apart saw blades that made parallel cuts in the edge of the workpiece. A heated knife removes material from the space between the spaced-apart slits produced by the saw blade to provide a groove. The saw blades are smooth and continuous rather than jagged, so that chunks will not be pulled out of the edge of the workpiece Whatever the effect of the continuous blades may be, it is thought the this sawing results in a certain level of dust production. In addition, it is necessary in this arrangement to feed each sheet sequentially through the machine and provide means for aligning the edges so that the groove is formed at the right position. Accordingly, it is an object of the present invention to cut grooves in a foamed synthetic resin workpiece with production of only a negligible amount of dust. It is a further object of the present invention to provide a plurality of grooves simultaneously and in such a manner that the grooves thus formed are automatically aligned with the faces of the sheets. A still further object of the present invention is to provide relatively sharp edges on the sheets that are grooved and avoid settling marks in the faces of the sheets.

SUMMARY OF THE INVENTION

The foregoing and related objects are achieved in a novel hot-wire cutting apparatus for cutting a plurality of grooves in a foamed synthetic resin workpiece having a first face and a second, substantially planar, face extending substantially perpendicularly to the first face. It includes a support structure providing a bed surface that defines a substantially horizontal bed plane and guide means mounted on the support structure adjacent the bed surface and providing a guide surface defining a cutting plane extending at a right angle to the bed plane for guiding the workpiece when its first and second faces are in abutting relationship with the bed and guide surfaces, respectively. The bed surface and the guide surface devine a path of travel in a direction parallel to the line of intersection of the bed plane and the cutting plane. Groove-cutting-wire mounting means are mounted on the support structure adjacent the bed surface and the guide means, and at least one groove-cutting wire is mounted on the groove-cutting-wire mounting means to provide a plurality of generally U-shaped operative portions vertically spaced from each other and from the bed surface. Each of the operative portions extends through the cutting plane with its leg portions vertically spaced apart and its web portion disposed inwardly of the cutting plane above the bed plane. Means electrically connected to the groove-cutting wire are adapted for connection to a voltage source for applying voltage from the voltage source to the groove-cutting wire to cause current to flow through the groove-cutting-wire operative portions and thereby to heat the operative portions. The operative portions thereby tend to cut vertically spaced grooves extending longitudinally in the direction of the path of travel in the second face of the associated workpiece when the first and second faces of the associated workpiece are in abutting relationship with the bed and guide surfaces, respectively, and the workpiece is moved in the direction of the path of travel past the groove-cutting wires.

Further benefits are obtained if a second groove-cutting-wire mounting means is mounted on the support structure at a position spaced transversely of the bed surface from the first-mentioned groove-cutting-wire mounting means and at least one second groove-cutting wire is mounted on the second groove-cutting-wire mounting means to provide a plurality of generally U-shaped second operative portions vertically spaced from each other. Each of the second operational portions extends through a common second cutting plane parallel to the first-mentioned cutting plane and spaced therefrom, and each of the operative portions has its leg portions vertically spaced apart and its web portion disposed inwardly of the second cutting plane above the bed plane. The means for applying voltage is electrically connected to the second groove-cutting wire for application of voltage from the voltage source to the second groove-cutting wire to cause current to flow therethrough and thereby to heat the second operative portions. The second operative portions thereby tend to cut vertically spaced grooves extending longitudinally in the direction of the path of travel in a third face of the workpiece if the workpiece has a substantially planar third face parallel to the second face and positioned in the second cutting plane while the first and second faces of the associated workpiece are in abutting relationship with the bed and guide surfaces, respectively, and the workpiece is moved in the direction of the path of travel past the first and second groove-cutting wires.

In the preferred embodiment, each groove-cutting-wire mounting means includes two groove-cutting-wire mounting posts adjustably mounted substantially parallel to each other for adjustment of relative vertical position and spacing in the direction of the path of travel. Each of the groove-cutting-wire operative portions has one leg mounted in one of the vertical posts and the other leg mounted in the other of the vertical posts; groove width is thereby adjustable by adjustment of the posts. Preferably, the mounting posts are electrically conductive and are electrically connected to the groove-cutting-wire operative portions. The means for applying voltage to the groove-cutting wires include the mounting posts and lead means adapted for connection to the voltage source and electrically connected to the mounting posts for impressing the voltage from the voltage source between the mounting posts.

The support structure may conveniently include a frame adjacent the bed surface and the guide member and extending upwardly of the bed plane. The groove-cutting-wire mounting posts would be mounted in the frame, and the groove-cutting wire would thereby be supported by the frame.

A particularly efficient arrangement includes first and second slice-cutting-wire mounting means mounted on the support structure adjacent the bed surface and the guide means and spaced apart transversely of the bed surface on either side of the groove-cutting-wire operative portions. At least one slice-cutting wire provides a plurality of slice-cutting-wire operative portions suspended substantially parallel to the bed surface between the slice-cutting-wire mounting means and vertically spaced from each other. Means adapted for connection to a voltage source are electrically connected to the slice-cutting wire for application of the voltage from the voltage source across the slice-cutting wire to cause a flow of current through the slice-cutting-wire operative portions and thereby to heat the slice-cutting-wire operative portions. The operative portions of the slice-cutting and groove-cutting wires thereby tend to cut the workpiece into slices and cut grooves therein when the first and second faces of the workpiece are in abutting relationship with the bed and guide surfaces, respectively, and the workpiece is moved in the direction of the path of travel past the operative portions of the slice-cutting and groove-cutting wires.

It is desirable for each of the slice-cutting-wire operative portions to be positioned farther in the direction of the path of travel than are all of the slice-cutting-wire operative portions above it. Each slice-cutting-wire operative portion thereby exits the workpiece after all the operative portions above it if the workpiece has a substantially flat rear face oriented perpendicularly to the direction of the path of travel. In one embodiment, however, the operative portions of the slice-cutting wire are divided into first and second groups, the slice-cutting-wire operative portions of the first group alternating with the slice-cutting-wire operative portions of the second group. Each slice-cutting-wire operative portion of the first group is positioned farther in the direction of travel than is the next higher slice-cutting-wire operative portion of the first group, and each of the slice-cutting-wire operative portions of the second group is positioned farther in the direction of the path of travel than is the next higher slice-cutting-wire operative portion of the second group. Each of the slice-cutting-wire operative portions of the second group is spaced from the slice-cutting-wire operative portion of the first group immediately above it in the predetermined direction of travel by more than a predetermined minimum spacing, and each of the slice-cutting-wire operative portions of the second group is spaced from the slice-cutting-wire operative portion of the first group immediately below it by less than the predetermined minimum spacing in the direction of travel. Each slice-cutting-wire thereby exits the workpiece after all the wires above it if the workpiece has a grooved planar rear face with grooves having groove depths equal to the predetermined minimum spacing and aligned with the slice-cutting-wire operative portions of the second group.

The first and second slice-cutting-wire mounting means may conveniently include first and second generally planar mounting plates, respectively, extending substantially parallel to the cutting plane and providing generally vertically extending edges with substantially horizontal slots therein receiving the slice-cutting-wire operative portions. The slots thereby vertically space the slice-cutting wires. The mounting plates are preferably electrically conductive and electrically connected to the slice-cutting-wire operative portions. The means for applying voltage include the mounting plates, and the mounting plates are adapted for connection to the voltage source for impressing the voltage from the voltage source between the mounting plates.

In the preferred embodiment, the frame is inclined from the vertical toward the bed surface, and the mounting plates are mounted on the frame. The frame thereby supports the slice-cutting and groove-cutting wires. Also in the preferred embodiment, each of the slice-cutting-wire mounting means includes a generally vertically extending slice-cutting-wire mounting post mounted on the frame outwardly of the mounting plates and a plurality of coil springs, each spring being connected at one end to the slice-cutting-wire mounting post and at the other end to one of the slice-cutting-wire operative portions outwardly of the adjacent mounting plate. Each slice-cutting-wire operative portion extends between a pair of the coil springs and is held in tension thereby.

In the ship-lap version, the slice-cutting-wire operative portions are organized into first and second groups, the slice-cutting-wire operative portions of the first group vertically alternating with the slice-cutting-wire operative portions of the second group. Each of the first groove-cutting-wire operative portions is associated with one of the slice-cutting-wire operative portions of the first group, each of the second groove-cutting-wire operative portions is associated with one of the slice-cutting-wire operative portions of the second group, and each groove-cutting-wire operative portion is horizontally aligned only with its associated slice-cutting-wire operative portion. The slice-cutting-wire and groove-cutting-wire operative portions are thereby positioned to cut the workpiece into ship-lap sheets.

In the tongue-and-groove version, each of the first groove-cutting-wire operative portions is associated with one of the slice-cutting-wire operative portions and horizontally aligned therewith, each of the second groove-cutting-wire operative portions is vertically spaced between adjacent slice-cutting wire operative portions, and each pair of adjacent slice-cutting-wire operative portions vertically flanks one of the second groove-cutting-wire operative portions. The first groove-cutting-wire operative portions vertically alternate with the second groove-cutting-wire operative portions, and the slice-cutting-wire operative portions and the groove-cutting-wire operative portions are thereby positioned to cut the workpiece into tongue-and-groove sheets.

BRIEF DESCRIPTION OF THE DRAWINGS

These and further features and advantages of the present invention are described in connection with the attached drawings, in which.

DETAILED DESCRIPTION OF THE PREFERRED EMBODIMENTS

Figure 1:
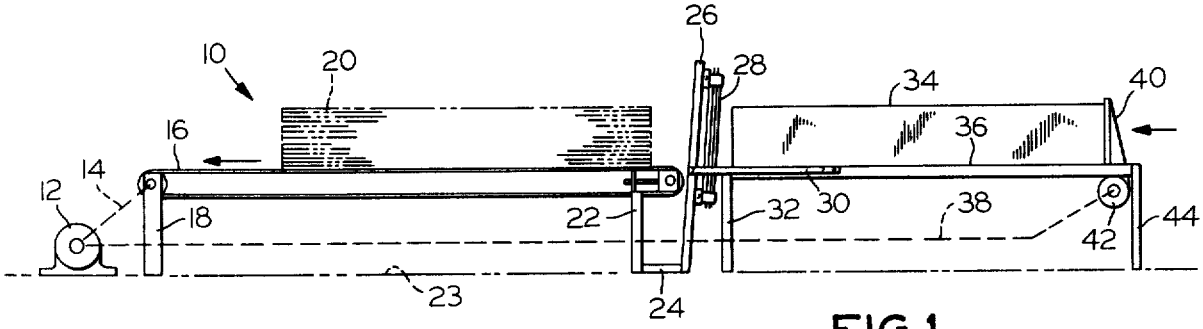
FIG. 1 is a side elevation of a somewhat simplified representation of the apparatus of the present invention.

FIG. 1 shows a hot-wire groove-cutting apparatus in which a foamed synthetic resin workpiece 34 is moved to the left by a ram 40 through groove-cutting and slice-cutting wires 28 to be deposited on a conveyor 16 in slices, as suggested by reference numberal 20. The apparatus includes a support structure that includes the various legs 18, 22, 32, and 34 on a foundation 23, a frame 26 on which the wires are mounted. The support structure provides a bed 36 and supports the conveyor 16. As suggested by dashed lines 14 and 38, a common motor 12 drives both conveyor 16 and ram 40. Ram 40 may be driven, for instance, by a chain drive, which is suggested by sprocket 42 located beneath it in the drawings. The wires 28 for slicing and cutting are mounted on mounting means mounted on the frame 26. Appropriate frame mounting members 24 and 30 support the frame.

Figure 2:
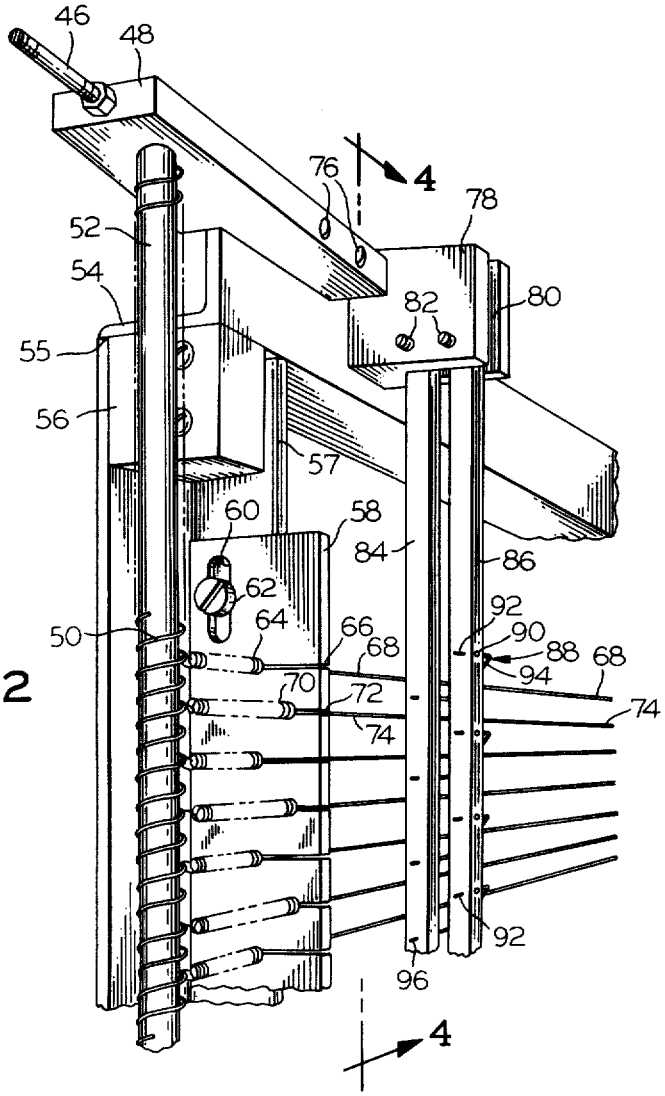
FIG. 2 is a perspective view part of the mounting means for the cutting wires of the present invention.

FIG. 2 shows in more detail the arrangement of the slice-cutting and groove-cutting wires. The slice-cutting wires 88 are rigid wires made of resistive material and formed into a U shape, with leg portions 92 and 96 being vertically spaced but not vertically aligned. The leg portions are connected by a web portion 94 that in the preferred embodiment is oriented at an angle with the horizontal. Although FIG. 2 shows the groove-cutting devices as individual U-shaped wires, it would be possible to provide a plurality of U-shaped operative portions in a single wire.

Each of the U-shaped wires 88 is mounted on two substantially vertical groove-cutting-wire mounting posts 84 and 86, which are suspended by an aluminum angle member 54 and an insulating block 78. Since power is applied to the groove-cutting wires 88 by the aluminum groove-cutting-wire mounting posts 84 and 86, it is necessary that the horizontal aluminum angle member 54 be insulated from the two mounting posts to avoid shorting them together. As will be seen in more detail in FIG. 4, mounting posts 84 and 86 fit in a recess 80 in insulating block 78 and are held snugly in place by set screws 82 that penetrate one face of insulation block 78 and press against mounting posts 84 and 86.

A vertically extending aluminum angle member 57 has insulating block 58 attached at its interior angle that extends slightly above its upper end. The horizontal angle member 54 rests on this insulation block 56 so as to provide clearance 55 between the two angle members 54 and 57.

The slice-cutting wires are mounted by mounting means that include a mounting plate 58 having a vertical slot 60 near its upper end through which a bolt 62 fastens it to vertical angle member 57. Mounting plate 58 has a series of vertically spaced grooves along one edge. The grooves alternate between relatively deep grooves, exemplified by groove 66, and relatively shallow grooves, represented by groove 72. As a result of this arrangement, the successive slice-cutting wires are vertically spaced but not vertically aligned.

The slice-cutting wires are suspended between steel slice-cutting-wire mounting posts, one of which, post 52, is shown in FIG. 2. Mounting post 52 extends vertically to enter an opening in a horizontally extending insulating block 48 attached to the upper end of horizontal angle member 54 by bolts 76. The vertical mounting post 52 has a helical wire 50 wound around it, and springs such as springs 64 and 70 are stretched between helical wire 50 and the slice-cutting wires. Spring 64 and another spring not shown on the other end of a slice-cutting wire 68 suspends slice-cutting wire 68 horizontally. Another spring 70 is similarly employed to suspend slice-cutting wire 74 between the vertical mounting posts. Slice-cutting-wire 68 is positioned farther to the left in FIG. 2 than slice-cutting wire 74 is because slice-cutting wire 68 is received in a slot 66 that is deeper than the slot 72 in which slice-cutting wire 74 is received.

Figure 3:
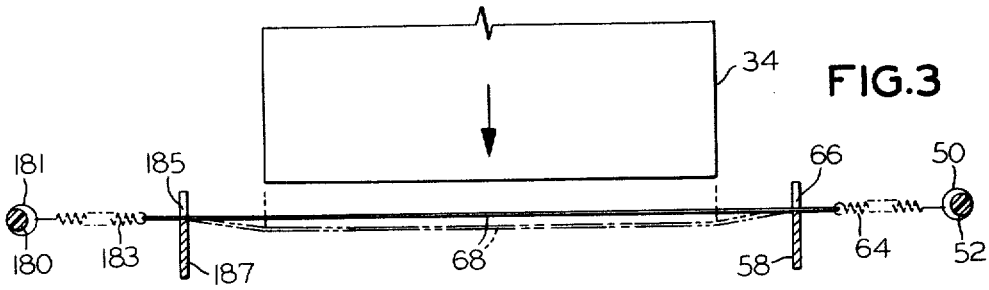
FIG. 3 is a plan view, partly in section, of the slice wires and their mounting means according to one version of the present invention.

FIG. 3 shows the mounting of the slice wires in plan view. The embodiment in FIG. 3 is slightly different from that in FIG. 2 in that the slice-cutting wires are not staggered. As will be explained in more detail below, the staggered arrangement of the slice-cutting wires is provided for workpieces in which the rear face has horizontal grooves, while the arrangement in FIG. 3, in which all slice wires are aligned, is provided for those situations in which the workpiece has a substantially flat rear face. As FIG. 3 shows, the slice-cutting wire 68 is suspended by means of slice-cutting-wire mounting springs 64 and 183 between vertical slice-cutting-wire mounting posts 52 and 180. The springs 64 and 183 are attached to the vertical posts 52 and 180 by means of the helical wires 50 and 181. As FIG. 3 shows in phantom, springs 64 and 183 permit slice-cutting wire 68 to deflect somewhat when the workpiece moves into contact with it but holds them straight when they are not contacted by the workpiece. Accordingly, the slice-cutting wires are permitted to give somewhat but are nonetheless kept substantially parallel to the bed surface at all times.

FIG. 3 can also be referred to for an understanding of the way in which the slice wires are powered. Voltage is applied across plates 58 and 187, and current is thereby caused to flow through the plates and the operative portions of the slice-cutting wires that stretch between the plates. The circuit is arranged so that the bulk of the resistance is encountered in the parallel circuit consisting of the several slice wires, and the slice wires are thereby heated. It is noted that, although springs 64 and 183 may be at the potentials of their associated plates, current does not flow through these springs, so power is not wasted to heat a part of the structure that is not used for cutting.

Figure 4:
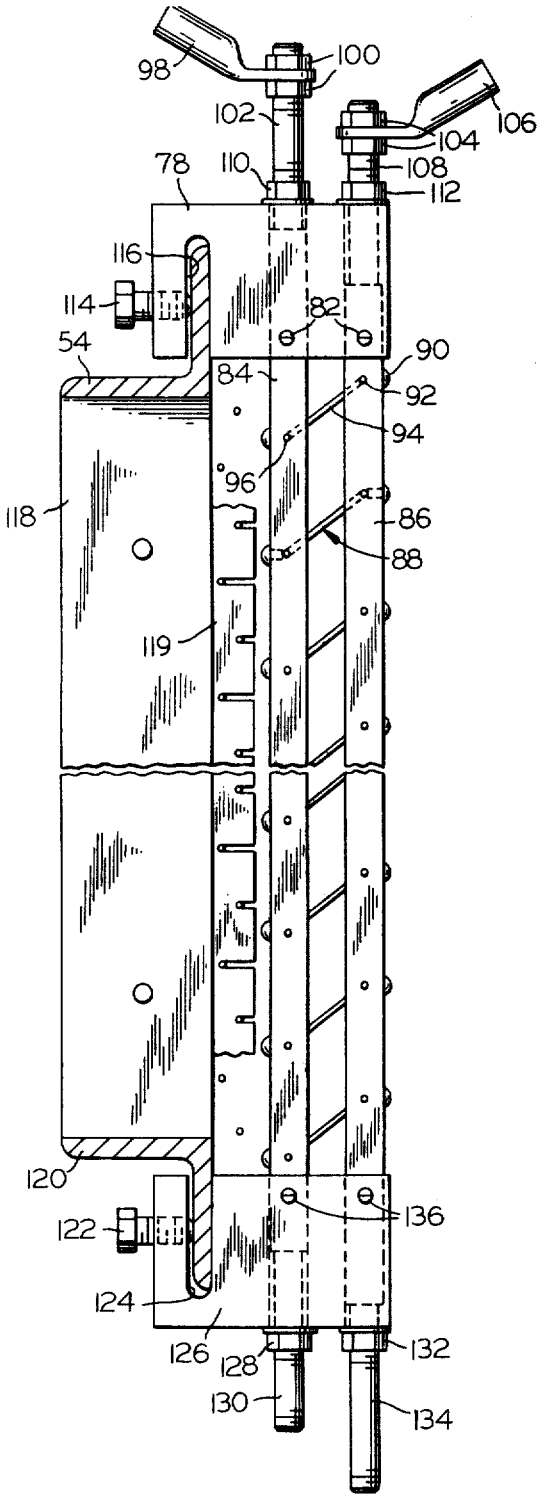
FIG. 4 is a sectional view taken at line 4—4 of FIG. 2.
Figure 5:
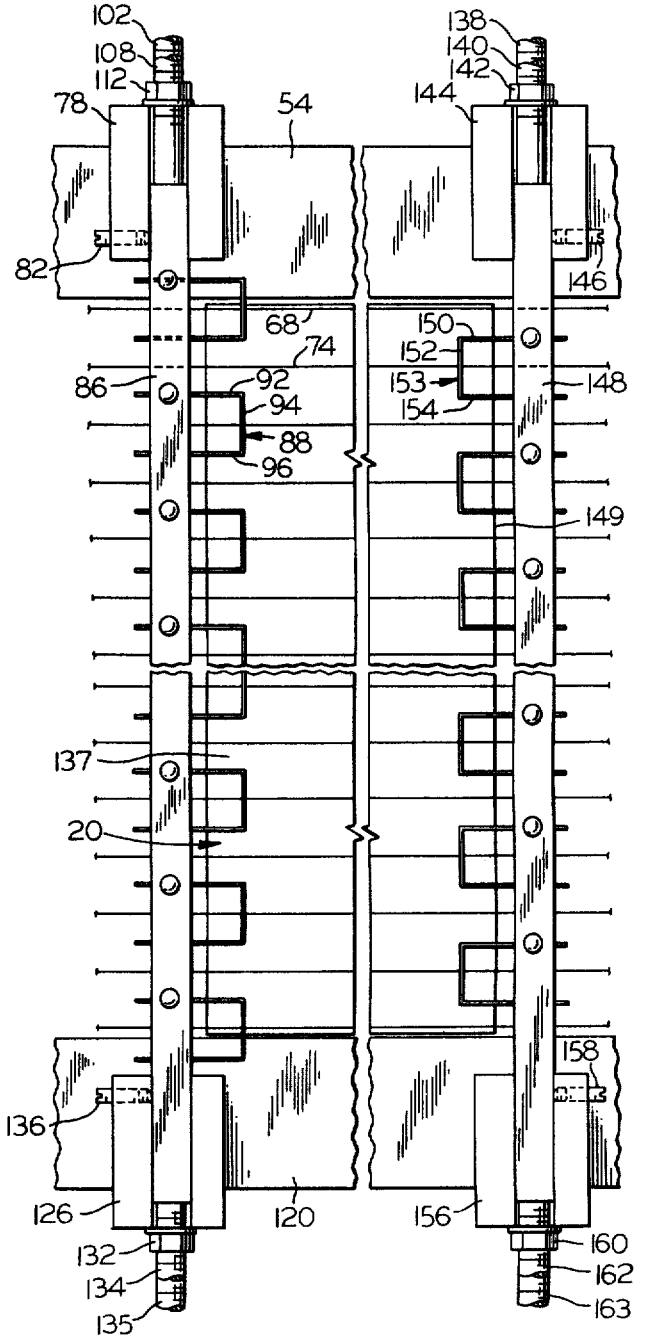
FIG. 5 is a vertical elevation of part of the groove-cutting-wire mounting means frame as seen from the right in FIG. 1.

FIGS. 4 and 5 show in more detail the mounting of the groove-cutting wires of FIG. 2. FIG. 4 is a section taken at line 4—4 of FIG. 2, while FIG. 5 is a vertical elevation viewed from the right in FIG. 2. The groove-cutting-wire mounting posts 84 and 86 shown in FIG. 2 are mounted between upper and lower aluminum angle members 54 and 120 by means of insulating blocks 78 and 126, respectively. The vertical portions of angle members 54 and 120 are received in slots 116 and 124, respectively, in insulating blocks 78 and 126, which are secured to the angle members by appropriate bolts 114 and 122 that are received in tapped holes in the insulating bolts. Mounting post 84 has threaded portions 102 and 130 at its upper and lower ends, respectively. Nuts 110 and 128 on the threaded portions 102 and 130 act with appropriate washers to hold mounting post 84 in place on insulating blocks 78 and 126. It can be seen that this method of mounting permits adjustment in height of mounting post 84. Mounting post 86 is similarly mounted at threaded portions 108 and 134 thereof by means of appropriate nuts 112 and 132.

FIGS. 4 and 5 illustrate that groove-cutting wires 84 are mounted between mounting posts 84 and 86. The groove-cutting wires are generally U-shaped with leg portions 92 and 96 connected by a web portion 94. One leg 92 is mounted and electrically connected to mounting post 86, while the other leg 96 is similarly connected to mounting post 84. Leg portions 92 and 96 are vertically spaced but, as FIG. 4 shows, not vertically aligned. It is not necessary for the purposes of the invention that the leg portions not be vertically aligned, but it can be appreciated that this is an advantageous feature, since it allows the mounting posts to serve as power busses. Power is applied to mounting posts 84 and 86 by high-current leads 98 and 106, respectively, that are mounted on threaded portions 102 and 108 by nuts 100 and 104. Leads 98 and 106 are adapted for application to an appropriate source of voltage. Voltage applied across leads 98 and 106 is present between mounting posts 84 and 86 all along their lengths, and the electrical connections of the groove-cutting wires 88 between them permits a flow of current between leads 98 and 106. This circuit is arranged so that the bulk of the resistance is present in the parallel groove-cutting wires.

It will be apparent to those skilled in the art that the circuit arrangement shown in FIG. 4 is not required for the practice of the present invention. All of the U-shaped operative portions could be included on a single wire, and the operative portions could thereby be provided in series, insuring that the same current runs through each operative portion. Any number of other arrangements could also be provided to cause current to flow through the operative portions. It is only necessary that there be at least one groove-cutting wire and that a plurality of operative portions be provided.

It can be appreciated from a perusal of FIGS. 2 and 4 that this arrangement of the groove-cutting wires and slice-cutting wires permits adjustability for proper alignment of the grooves in the edges of the workpiece. The widths of the grooves can easily be adjusted by adjusting the height of, say, mounting post 86 while keeping mounting post 84 in its position. This is accomplished, of course, by loosening nuts 132 and 112 and the appropriate set screw 82. The height is then adjusted, the set screw is tightened again, and the nuts can then be easily be tightened into place.

The relative positions of the groove-cutting wires and the slice-cutting wires can also be adjusted by adjusting the position of mounting plate 58 on vertical angle member 57. This is accomplished by loosening bolts 62 and moving mounting plate 58. The relative positions can, of course, also be adjusted by adjustments in both mounting posts 84 and 86 simultaneously, but this would only be desirable in those situations in which it is not permitted to change the relative positioning of the slice wires and the bed.

Figure 7:
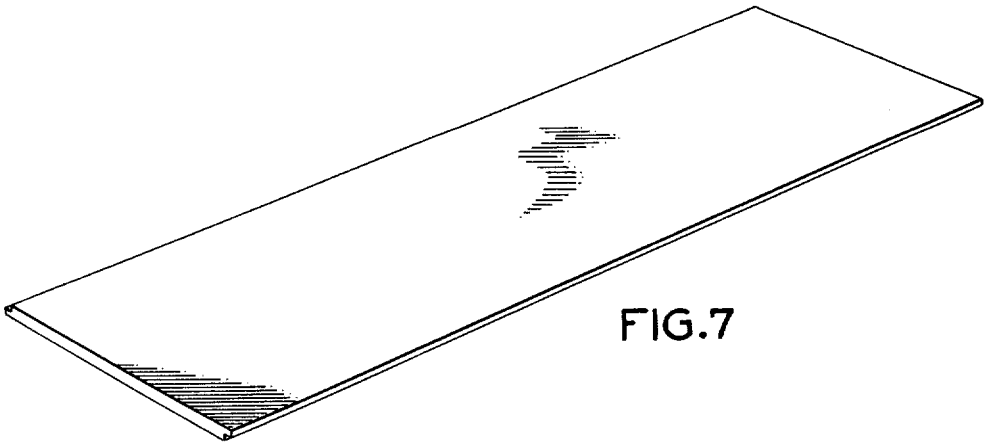
FIG. 7 is a perspective of a ship-lap sheet made according to the teachings of the present invention.
Figure 8:
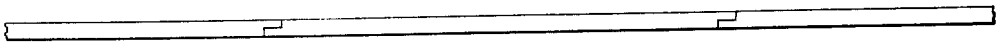
FIG. 8 shows three interlocking ship-lap sheets of the type shown in FIG. 7.

The ship-lap arrangement of the slice-cutting and groove-cutting wires can be seen most clearly in FIG. 5. This arrangement, which produces the ship-lap sheets shown in FIGS. 7 and 8, has complementary groove-cutting-wire operative portions that are vertically staggered. A second pair of mounting posts, one of which is indicated by reference numeral 148 in FIG. 5, is spaced transversely of the bed from the first pair of mounting posts and has a plurality of operative portions 153 mounted on it. FIG. 5 shows mounting post 148, which corresponds to mounting post 86, as having threaded portions 140 and 162 at either end. Nuts 142 and 160 on threaded portions 140 and 162 mount past 148 on insulation blocks 144 and 156, which are mounted on horizontal angle members 54 and 120 in a manner similar to that by which insulation blocks 78 and 126 are mounted. Just as mounting posts 84 and 86 are snugly held in place by set screws 82 and 136, mounting post 148 and its unseen mate are also snugly held in place by set screws 146 and 158. The unseen mounting post is suggested in FIG. 5 by its threaded portion 138.

The ship-lap configuration shown in FIG. 5 is characterized by the fact that the slice-cutting wires can be thought of as being organized into two groups that alternate vertically. In this case, the slice-cutting wires of one group are those that are received in deep slots in the mounting plates, while those in the second group would be those received in shallow slots. There is a correspondence between the operative portions on the right side of FIG. 5 and the first group of slice-cutting wires and between the operative portions on the left in FIG. 5 and the second group of slice-cutting wires. Each operative portion is horizontally aligned with its associated slice-cutting wire, and the operative portions thereby alternate vertically to result in the workpiece being cut into ship-lap sheets.

Figure 6:
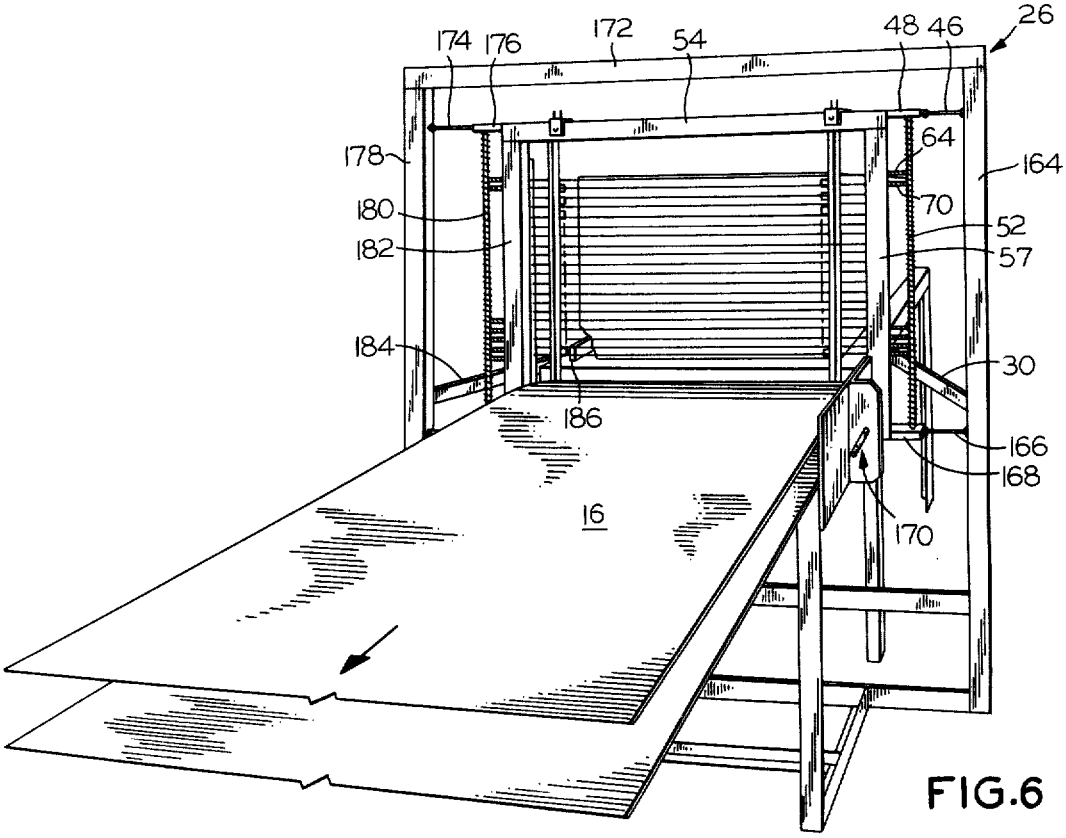
FIG. 6 is a perspective view of the apparatus of FIG. 1 as seen from the left in FIG. 1.

FIG. 6 is a perspective view from the left end in FIG. 1 and shows the mounting of the various mounting members on the support structure. Horizontal insulation block 48 of FIG. 2 and FIG. 6, corresponding insulating blocks 176 and 168 shown in FIG. 6, and a further insulating block opposite block 168 in FIG. 6 all serve to insulate the aluminum horizontal angle members 54 and 120 from horizontal mounting studs 46, 166, 174, and a further one not seen in FIG. 6. These mounting studs support the mounting members for the various cutting wires on the frame 26 seen in FIGS. 1 and 6. Frame 26 holds the various cutting wires in a fixed orientation to the direction of travel of the workpiece, which is propelled along bed 36 (FIG. 1) by ram 40 (also in FIG. 1). Since the transverse position of the workpiece is important, a guide member 186 extending longitudinally of bed 36 is provided, as seen to the right of the workpiece in FIG. 6. A further guide may be provided on the other side of the workpiece if desired. Ram 40 propels the workpiece through the cutting wires and deposits it on conveyor 16 to permit it to be off-loaded as desired. Of course, the slicing may be separated from the groove cutting if desired, in which case the workpiece could be provided as a stack of already-sliced sheets. Alternatively, the grooves can be cut in the workpiece before it is sliced. However, it is seen that the combination of the two functions affords a great savings in time.

Figure 9:
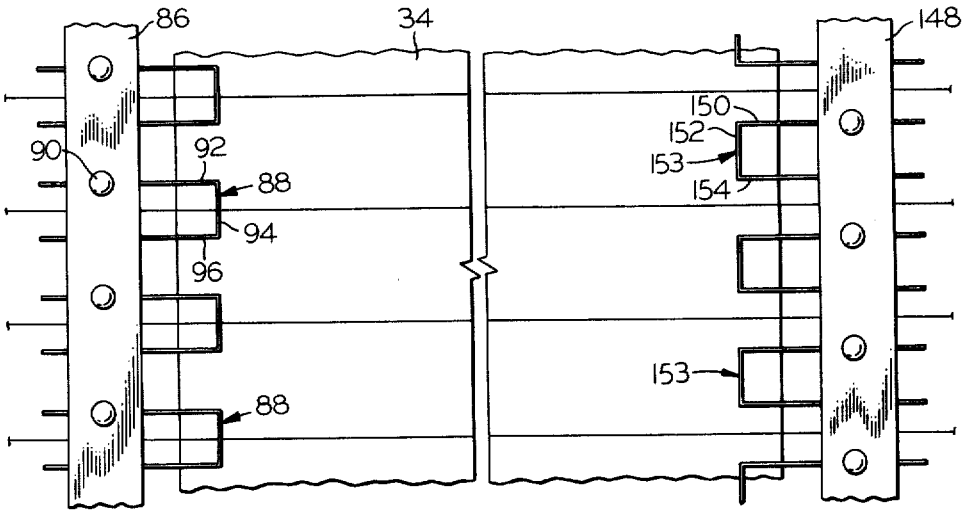
FIG. 9 is a simplified view of an arrangement of the present invention for producing tongue-and-groove sheets.
Figure 10:
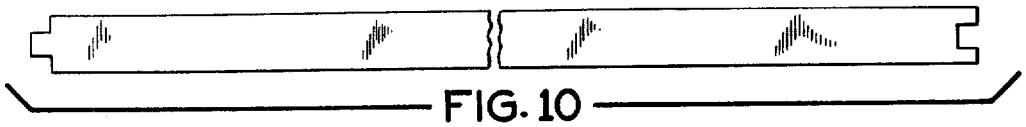
FIG. 10 shows a tongue-and-groove sheet of the type produced by the apparatus shown in FIG. 9.
Figure 11:
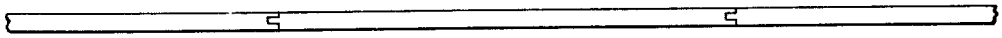
FIG. 11 shows three interlocking tongue-and-groove sheets of the type shown in FIG. 10.

It will be appreciated by those skilled in the art that a similar arrangement can be provided to produce tongue-and-groove sheets. If it is desired to produce tongue-and-groove sheets, the arrangement of FIG. 9 is used, in which a groove-cutting wire is provided on both sides for each slice-cutting wire. In this instance, the groove-cutting wire operative portions on one side are horizontally aligned with the operative portions of the slice-cutting wires, while the groove-cutting-wire operative portions on the other side are each flanked by pairs of adjacent operative portions of the slice-cutting wires. This arrangement produces the tongue-and-groove sheets illustrated in FIGS. 10 and 11.

It was noted in connection with the discussion of FIG. 1 that the frame 26 was mounted at an angle to the direction of motion of the workpiece. As a result, the slice-cutting wires are arranged so that the upper wires will exit a workpiece before the lower slice-cutting wires do if the workpiece has a substantially vertical rear face. In other words, the desired order in which the slice-cutting wires exit is achieved when the wires are oriented at an angle to the rear face.

Figure 12:
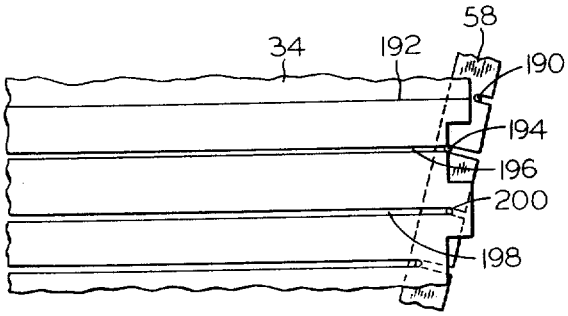
FIG. 12 is a simplified vertical section of a grooved rear face of a workpiece with the slice-cutting wires leaving it.

The importance of this arrangement is illustrated in FIG. 12, in which the example of a grooved rear face is shown. The slice-cutting-wire mounting plate 58 is shown at a rather exaggerated angle with the vertical; in practice, the angle may be 8° or even less. Slice-cutting-wires 190, 194, and 198 are shown, with slice-cutting-wire 90, the highest in the figure, being shown as already having exited workpiece 34. As a result, a line 192 is provided in the drawing to designate the interface between the two sheets that result. The line is given no substantial thickness because, slice-cutting wire 190 having already left the workpiece, there is no substantial gap between sheets. However, slice-cutting wires 194 and 200 still remain in the workpiece, so there are gaps 196 and 198 between the sheets. From this it can be appreciated that the sheets above a slice-cutting wire tend to settle slightly as the wire leaves the workpiece, and it is for this reason that provision is made for each slice-cutting wire to lead the workpiece ahead of those below it. If a slice-cutting wire were to leave the workpiece before the wires above it, the settling would cause the upper slice-cutting wires to leave marks in the faces of the sheets they are cutting or, if the settling occurs just as the wires are leaving the workpiece, to feather the edges of the sheets. Accordingly, it is a particularly advantageous feature of this arrangement that the slice-cutting wires are aligned at an angle with the vertical.

It can be observed in FIG. 12 that equal spacing of the slots in mounting plate 58 results in sheets of two different thicknesses. As a practical matter, this is not a problem, because the inclination of the mounting plates is much less than that shown in FIG. 12. Thus, the difference in thickness is small enough that the spacing of the slots can remain equal.

It will be apparent that the staggering shown in FIG. 12 is not necessary, or even desirable, for a workpiece on which the rear face is flat; for such a workpiece, there would be no staggering of the slice-cutting wires, merely an incline of the slice-cutting-wire mounting means. Such an arrangement of slice-cutting wires would be appropriate not only for a workpiece with a flat rear face but also for one in which grooves had previously been cut in a tongue-and-groove manner.

It is apparent from the foregoing description that a novel apparatus has been provided that can simultaneously cut a plurality of grooves in a side face of a workpiece. In the embodiment shown, the grooves can be cut in two faces simultaneously, and slices can be cut at the same time. Furthermore, by providing the slice-cutting wires at an angle to the rear face of the workpiece, sharp edges can be achieved and settling marks avoided. Finally, by using a hot-wire device to cut the grooves, dust production is avoided.

Having thus described the invention, I claim:

1. A hot-wire cutting apparatus for cutting a plurality of grooves in a foamed synthetic resin workpiece having a first face and a second, substantially planar, face extending substantially perpendicularly to the first face, comprising:

a. a support structure providing a bed surface that defines a substantially horizontal bed plane;

b. guide means mounted on said support structure adjacent said bed surface and providing a guide surface defining a cutting plane extending at a right angle to said bed plane for guiding the workpiece when its first and second faces are in abutting relationship with said bed and guide surfaces, respectively, said bed surface and said guide surface defining a path of travel in a direction parallel to the line of intersection of said bed plane and said cutting plane;

c. groove-cutting-wire mounting means mounted on said support structure adjacent said bed surface and said guide means;

d. at least one groove-cutting wire mounted on said groove-cutting-wire mounting means to provide a plurality of generally U-shaped operative portions vertically spaced from each other and from said bed surface, each of said operative portions extending through said cutting plane with its leg portions vertically spaced apart and its web portion disposed inwardly of said cutting plane above said bed plane; and e. means electrically connected to said groove-cutting wire and adapted for connection to a voltage source for applying voltage from said voltage source to said groove-cutting wire to cause current to flow through said groove-cutting-wire operative portions and thereby to heat said operative portions, said operative portions thereby tending to cut vertically spaced grooves extending longitudinally in the direction of said path of travel in the second face of the associated workpiece when the first and second faces of the associated workpiece are in abutting relationship with said bed and guide surfaces, respectively, and the workpiece is moved in the direction of said path of travel past said groove-cutting wires.

2. The hot-wire cutting apparatus of claim 1 wherein there is included:

a. a second groove-cutting-wire mounting means mounted on said support structure at a position spaced transversely of said bed surface from said first-mentioned groove-cutting wire mounting means; and b. at least one second groove-cutting wire mounted on said second groove-cutting-wire mounting means to provide a plurality of generally U-shaped second operative portions vertically spaced from each other, each of said second operational portions extending through a common second cutting plane parallel to said first-mentioned cutting plane and spaced therefrom, each of said operative portions having its leg portions vertically spaced apart and its web portion disposed inwardly of said second cutting plane above said bed plane, said means for applying voltage being electrically connected to said second groove-cutting wire for application of voltage from said voltage source to said second groove-cutting wire to cause current to flow therethrough and thereby to heat said second operative portions, said second operative portions thereby tending to cut vertically spaced grooves extending longitudinally in the direction of said path of travel in a third face of the workpiece if the workpiece has a substantially planar third face parallel to the second face and positioned in the second cutting plane while the first and second faces of the associated workpiece are in abutting relationship with said bed and guide surfaces, respectively, and the workpiece is moved in the direction of said path of travel past said first and second groove-cutting wires.

3. The hot-wire cutting apparatus of claim 1 or 2 wherein each groove-cutting-wire mounting means includes two groove-cutting-wire mounting posts adjustably mounted substantially parallel to each other for adjustment of relative vertical position and spacing in the direction of the path of travel, each of said groove-cutting-wire operative portions having one leg mounted in one of said vertical posts and the other leg mounted in the other of said vertical posts, groove width thereby being adjustable by adjustment of said posts.

4. The hot-wire cutting apparatus of claim 3 wherein said mounting posts are electrically conductive and are electrically connected to said groove-cutting-wire operative portions and wherein said means for applying voltage to said groove-cutting wires include said mounting posts and lead means adapted for connection to the voltage source and electrically connected to said mounting posts for impressing the voltage from said voltage source between said mounting posts.

5. The hot-wire cutting apparatus of claim 4 wherein said support structure includes a frame adjacent said bed surface and said guide member and extending upwardly of said bed plane, said groove-cutting-wire mounting posts being mounted in said frame, said groove-cutting wire thereby being supported by said frame.

6. The hot-wire cutting apparatus of claim 1 wherein there is included:

a. first and second slice-cutting-wire mounting means mounted on said support structure adjacent said bed surface and said guide means and spaced apart transversely of said bed surface on either side of said groove-cutting-wire operative portions;

b. at least one slice-cutting wire providing a plurality of slice-cutting-wire operative portions suspended substantially parallel to said bed surface between said slice-cutting-wire mounting means and vertically spaced from each other; and c. means adapted for connection to a voltage source and electrically connected to said slice-cutting wire for application of the voltage from the voltage source across said slice-cutting wire to cause a flow of current through said slice-cutting-wire operative portions and thereby to heat said slice-cutting-wire operative portions, said operative portions of said slice-cutting and groove-cutting wires thereby tending to cut the workpiece into slices and cut grooves therein when the first and second faces of said workpiece are in abutting relationship with said bed and guide surfaces, respectively, and the workpiece is moved in the direction of said path of travel past said operative portions of said slice-cutting and groove-cutting wires.

7. The hot-wire cutting apparatus of claim 6 wherein each of said slice-cutting-wire operative portions is positioned farther in the direction of the path of travel than are all of the slice-cutting-wire operative portions above it, each slice-cutting-wire operative portion thereby exiting the workpiece after all the operative portions above it if the workpiece has a substantially flat rear face oriented perpendicularly to the direction of said path of travel.

8. The hot-wire cutting apparatus of claim 6 wherein said operative portions of said slice-cutting wire are divided into first and second groups, said slice-cutting-wire operative portions of said first group alternating with said slice-cutting-wire operative portions of said second group, each slice-cutting-wire operative portion of said first group being positioned farther in the direction of travel than is the next higher slice-cutting-wire operative portion of the first group, each of the slice-cutting-wire operative portions of said second group being positioned farther in the direction of said path of travel than is the next higher slice-cutting-wire operative portion of said second group, each of said slice-cutting-wire operative portions of said second group being spaced from the slice-cutting-wire operative portion of said first group immediately above it in the predetermined direction of travel by more than a predetermined minimum spacing, each of said slice-cutting-wire operative portions of said second group being spaced from the slice-cutting-wire operative portion of said first group immediately below it by less than said predetermined minimum spacing in the direction of travel, each slice-cutting-wire thereby exiting the workpiece after all the wires above it if the workpiece has a grooved planar rear face with grooves having groove depths equal to said predetermined minimum spacing and aligned with said slice-cutting-wire operative portions of said second group.

9. The hot-wire cutting apparatus of claim 6 wherein said first and second slice-cutting-wire mounting means include first and second generally planar mounting plates, respectively, extending substantially parallel to said cutting plane and providing generally vertically extending edges with substantially horizontal slots therein receiving said slice-cutting-wire operative portions, said slots thereby vertically spacing said slice-cutting wires.

10. The hot-wire cutting apparatus of claim 9 wherein each groove-cutting-wire mounting means includes two groove-cutting-wire mounting posts adjustably mounted substantially parallel to each other for adjustment of relative vertical position and spacing in the direction of the path of travel, each of said groove-cutting-wire operative portions having one leg mounted in one of said vertical posts and the other leg mounted in the other of said vertical posts, groove width thereby being adjustable by adjustment of said posts.

11. The hot-wire cutting apparatus of claim 10 wherein said mounting plates are electrically conductive and electrically connected to said slice-cutting-wire operative portions, said means for applying voltage including said mounting plates, and said mounting plates being adapted for connection to the voltage source for impressing the voltage from said voltage source between said mounting plates.

12. The hot-wire cutting apparatus of claim 11 wherein said mounting posts are electrically conductive and electrically connected to said groove-cutting-wire operative portions and wherein said means for applying voltage to said groove-cutting wires include said mounting posts and lead means adapted for connection to the voltage source and electrically connected to said mounting posts for impressing the voltage from said voltage source between said mounting posts.

13. The hot-wire cutting apparatus of claim 12 wherein said support structure includes a frame adjacent said bed surface and said guide member, extending upwardly from said bed plane, and inclined from the vertical toward said bed surface, said mounting plates and mounting posts being mounted on said frame, said frame thereby supporting said slice-cutting and groove-cutting wires.

14. The hot-wire cutting apparatus of claim 13 wherein each of said slice-cutting-wire mounting means includes a generally vertically extending slice-cutting-wire mounting post mounted on said frame outwardly of said mounting plates and a plurality of coil springs, each spring being connected at one end to said slice-cutting-wire mounting post and at the other end to one of said slice-cutting-wire operative portions outwardly of the adjacent mounting plate, each slice-cutting-wire operative portion extending between a pair of said coil springs and being held in tension thereby.

15. The hot-wire cutting apparatus of claim [1,] 6, 7, or 8 wherein there are included:

a. a second groove-cutting-wire mounting means mounted on said support structure at a position spaced transversely of said bed surface from said first-mentioned groove-cutting-wire mounting means;

b. at least one second groove-cutting wire mounted on said second groove-cutting-wire mounting means to provide a plurality of U-shaped second operational portions vertically spaced from each other, each of said second operative portions extending through a second cutting plane parallel to said first cutting plane with its web portion disposed inwardly of said second cutting plane and its leg portions vertically spaced apart, said means for applying voltage to said first groove-cutting wire being electrically connected to said second groove-cutting wire for application of voltage from said voltage source to said second groove-cutting wire to cause current to flow through said second groove-cutting-wire operative portions and thereby to heat them, said second groove-cutting-wire operative portions thereby tending to cut vertically spaced grooves extending longitudinally in the direction of said path of travel in a third face of the workpiece if the work piece has a substantially planar third face located in said second cutting plane while the first and second faces of the workpiece are in abutting relationship with said bed and guide surfaces, respectively, and the workpiece is moved in the direction of said path of travel past said groove-cutting wires.

16. The hot-wire cutting apparatus of claim 15 wherein said slice-cutting-wire operative portions are organized into first and second groups, said slice-cutting-wire operative portions of said first group vertically alternating with said slice-cutting-wire operative portions of said second group, each of said first groove-cutting-wire operative portions being associated with one of said slice-cutting-wire operative portions of said first group, each of said second groove-cutting-wire operative portions being associated with one of said slice-cutting-wire operative portions of said second group, each groove-cutting-wire operative portion being horizontally aligned only with its associated slice-cutting-wire operative portion, said slice-cutting-wire and groove-cutting-wire operative portions thereby being positioned to cut the workpiece into ship-lap sheets.

17. The hot-wire cutting apparatus of claim 15 wherein each of said first groove-cutting-wire operative portions is associated with one of said slice-cutting-wire operative portions and horizontally aligned therewith, each of said second groove-cutting-wire operative portions being vertically spaced between adjacent slice-cutting wire operative portions, each pair of adjacent slice-cutting-wire operative portions vertically flanking one of said second groove-cutting-wire operative portions, said first groove-cutting-wire operative portions vertically alternating with said second groove-cutting-wire operative portions, said slice-cutting-wire operative portions and said groove-cutting-wire operative portions thereby being positioned to cut the workpiece into tongue-and-groove sheets.

* * * * *